United States Patent [19]
Hefren

[11] 3,980,315
[45] Sept. 14, 1976

[54] STABILIZER APPARATUS FOR ROAD VEHICLES

[76] Inventor: Fred W. Hefren, 609 E. Ninth St., Winfield, Kans. 67156

[22] Filed: Apr. 14, 1975

[21] Appl. No.: 567,682

[52] U.S. Cl. ............................... 280/94; 267/150; 280/96
[51] Int. Cl.² .......................................... B62D 7/08
[58] Field of Search ............. 280/94, 96, 96.2, 268; 267/150

[56] References Cited
UNITED STATES PATENTS

| | | | |
|---|---|---|---|
| 1,210,490 | 1/1917 | Kittle | 280/94 |
| 1,346,211 | 7/1920 | Johnson | 280/94 |
| 3,333,863 | 8/1967 | Bishop | 280/94 |
| 3,375,020 | 3/1968 | Worsham | 280/96.2 R |
| 3,448,991 | 6/1969 | Leggett | 280/94 |
| 3,721,455 | 3/1973 | Blanton | 280/94 |
| 3,762,740 | 10/1973 | Cass | 280/96 |
| 3,823,957 | 7/1974 | Bishop | 280/94 |
| 3,848,885 | 11/1974 | Hefren | 280/94 |

*Primary Examiner*—M. H. Wood, Jr.
*Assistant Examiner*—Terrance L. Siemens
*Attorney, Agent, or Firm*—Marcus L. Bates

[57] ABSTRACT

A stabilizer apparatus which can be connected to the steering mechanism of a vehicle such that movement of the vehicle wheels from a neutral position is resisted by a spring assembly. A special grease filled housing protects the critical components thereof from the deleterious effects of the ambient conditions, as well as imparting the vehicle with desirable steering characteristics.

12 Claims, 5 Drawing Figures

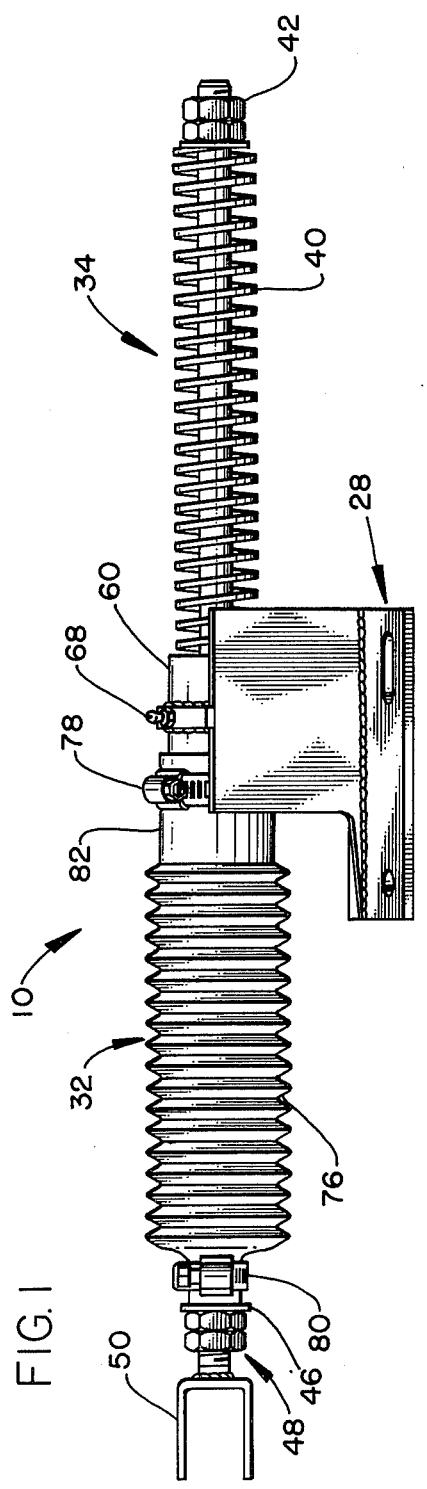
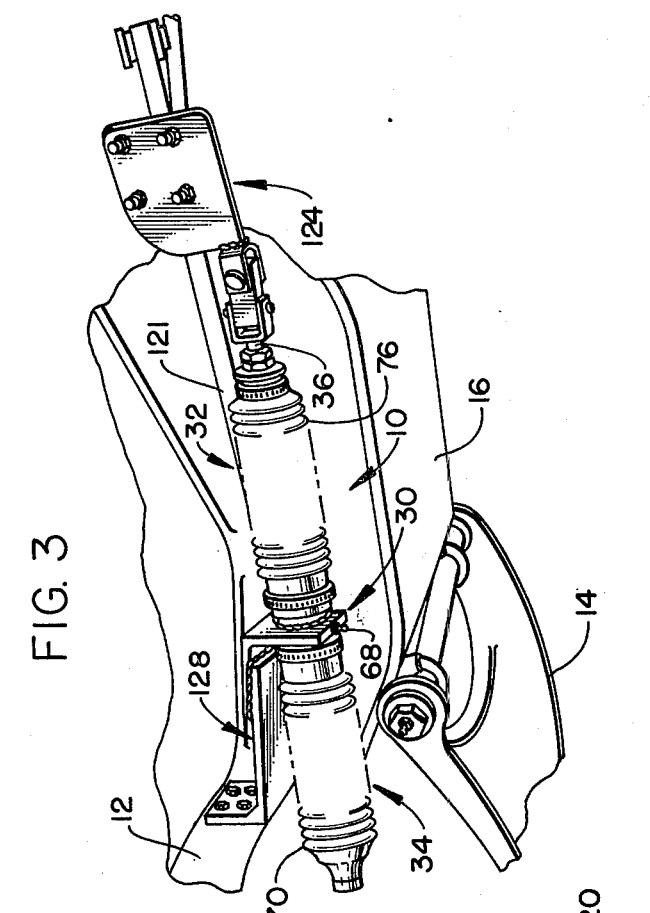
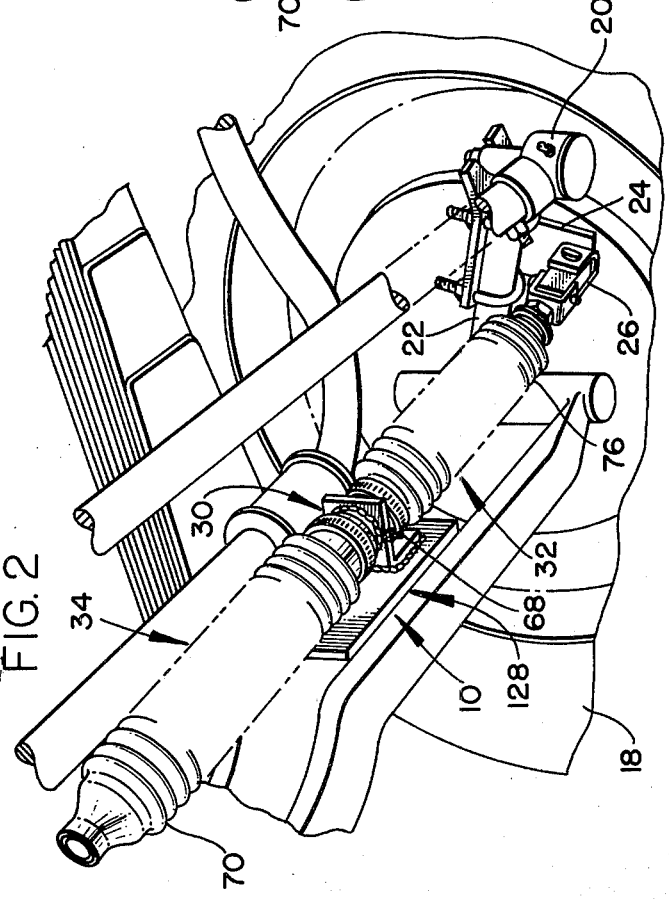

STABILIZER APPARATUS FOR ROAD VEHICLES

BACKGROUND OF THE INVENTION

Road vehicles, such as automobiles and trucks, are often wrecked when unusual conditions are encountered, such as severe cross winds, tire blow outs, or when the vehicle is traversing irregular or rough road surfaces. Various solutions to these problems are set forth in the following prior art to which reference is made for further background of the invention: Hefren U.S. Pat. No. 3,848,885; Leggett U.S. Pat. No. 3,448,991; Worsham U.S. Pat. No. 2,993,704; Worsham U.S. Pat. No. 3,375,020; Bishop U.S. Pat. No. 3,333,963, and to the various references made of record therein.

In my previously issued Pat. No. 3,848,885, referred to above, it is pointed out that installation of some prior art stabilizer apparatus is often a difficult and time consuming task, and that the vehicle wheel must sometimes be removed so that additional parts may be added thereto for accommodation of the stabilizer assembly.

Moreover, when driving over wet or muddy roads during cold weather, moisture will accumulate on the stabilizer apparatus and subsequently freeze into ice, whereupon the stabilizer is effectively locked into fixed position and control of the steering system of the vehicle is subsequently lost. This dangerous situation is especially perilous when the formation of ice accumulates while the vehicle is traveling on a straight stretch of road prior to entering a curve, whereupon it belatedly is discovered that there is insufficient turning radius available in the steering mechanism for the vehicle to safely negotiate the curve. Accumulation of mud on the steering mechanism also interferes with the proper and safe operation of the prior art stabilizer assemblies.

Accordingly, it is desirable to have a stabilizer assembly for improving the steering mechanism of a vehicle which can be attached thereto in an uncomplicated, easy, and economical manner without disassembling any parts of the steering mechanism of the vehicle, and which is not subject to the above deleterious effects of the weather.

SUMMARY OF THE INVENTION

This invention relates to a stabilizer apparatus for use in conjunction with the steering mechanism of a vehicle, comprised of an assembly of elements including spaced fixed and movable mounting brackets having spring means associated therewith so that the brackets must compress a spring when moved toward or away from one another.

A resilient housing encapsulates each of the springs and protects the most vulnerable components thereof from debris and especially from ice and mud accumulations. The housing also forms a grease chamber within which a lubricant can be stored.

The brackets are fabricated in a special configuration which enables rapid attachment to the steering system of a number of different types of vehicles so that each steerable wheel of the vehicle is always biased into the neutral steering position.

Specifically, the stabilizer apparatus is comprised of a fixed and a movable mounting bracket spaced from one another and arranged with the fixed mounting bracket attached to either the axle, the frame, or the cross member of the vehicle. The movable mounting bracket is attached to the steering linkage which imparts movement into the steerable wheel. A spring biased shaft is reciprocatingly received through the fixed mounting bracket so that the axial movement of the shaft in either longitudinal direction is resisted by a compression spring.

The springs and at least part of the shaft are housed within one of the resilient housing, and each cooperates with one another and with the fixed bracket in an unusual manner which greatly increases the utility of the entire assembly.

Therefore, a primary object of the present invention is the provision of improvements in a stabilizer for attachment to the steerable wheels of a vehicle which can be directly attached to the steering mechanism, and which is protected from the deleterious effects of the weather.

Another object of the invention is to provide improvements in stabilizers for the steering systems of vehicles having steerable wheels mounted by a knee action type suspension system.

A further object of this invention is to disclose and provide improvements in stabilizers for steering systems of vehicles which have a solid front axle.

A still further object of this invention is to provide a stabilizer apparatus in combination with the steering system of a road vehicle which tends to maintain the steering wheels thereof biased into a neutral steering position, and which are housed in a manner to provide a special lubricant chamber which isolates the critical components thereof from ambient conditions.

Another and still further object of the invention is to provide improvements in stabilizer apparatus for the steering system of a road vehicle which utilizes both resilient springs as well as a fluid for increasing the safety of the steering mechanism of a vehicle.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a perspective view of a stabilizer apparatus made in accordance with the present invention, with some parts being removed therefrom;

FIG. 2 is a reduced, fragmentary perspective view of the stabilizer apparatus shown in FIG. 1 operatively associated with part of the suspension system of a road vehicle;

FIG. 3 is similar to FIG. 2 and sets forth another embodiment of the invention;

BRIEF DESCRIPTION OF THE INVENTION

Figure 4:
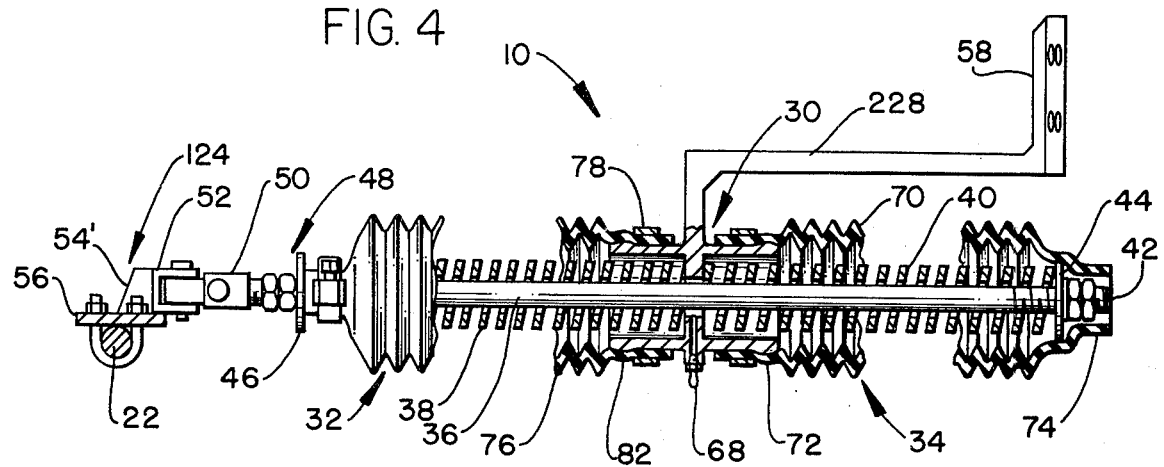
FIG. 4 is a reduced, part cross-sectional, elevational view of the apparatus disclosed in FIG. 1; and, FIG. 5 is an enlarged, fragmentary, part cross-sectional view of the apparatus disclosed in the foregoing Figures.

FIG. 1 discloses a stabilizer apparatus 10 made in accordance with the present invention. As seen disclosed in FIGS. 2 and 3, in conjunction with some of the remaining Figures, part of a conventional vehicle is schematically illustrated which includes the usual spaced longitudinal frame members 12 from which there is supported a knee action suspension system comprised of spaced pairs of upper and lower arms, one of which is seen at 14. The arm is articulated from a main cross-member 16, while a wheel 18 ground supports the vehicle in the usual manner.

Tie rod end 20 is connected to a tie rod 21 in the usual manner so that pivotal motion is imparted into a spindle arm 22, thereby enabling the vehicle steering mechanism to pivot the steering wheels in a horizontal plane about a steering axis.

A movable mount bracket 24 is attached in one of the several illustrated manners to the steering apparatus of the vehicle and moves respective to a fixed mount bracket 28 so that a resisting force is increasingly applied to the turning force when the brackets move in either direction respective to one another.

As seen in the various Figures of the drawings, the fixed mount bracket of the stabilizer apparatus is provided with a loading barrel 30 which forms a spring retainer housing; and, which provides several different novel functions, as will be pointed out in greater detail later on in this disclosure. A first spring loaded assembly 32 is spaced from a second spring loaded assembly 34 by the beforementioned housing. Shaft 36 is axially aligned with and telescopingly received by the housing and includes spaced compression springs 38 and 40. The springs are spaced apart from one another and have marginal adjacent end thereof received within the housing.

The shaft has a free end portion 42 for adjustably accommodating spring retainer 44 thereon, while the attached end portion of the shaft is provided with a similar spring retainer 46. The attached end 48 of the shaft is adjustably connected to a yoke 50 and U-joint assembly 52, so that web 54 can transfer loads between the plate member 56 and the shaft. The plate member is illustrated as being attached to spindle arm 22 by means of the illustrated U-bolts.

Figure 5:
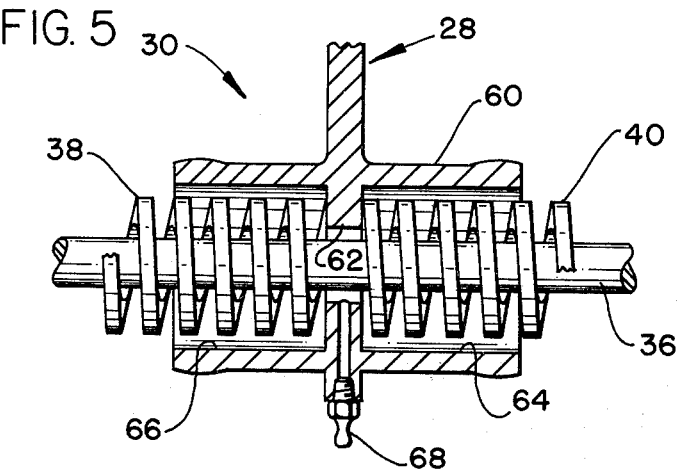

As best seen in the illustration of FIG. 5, the loading barrel is provided with an axial bore divided into opposed connecting chambers by means of circumferentially extending shoulder 62. The shaft, together with the barrel, form spaced annular spring-receiving chambers 64 and 66, which communicate with one another and with the grease fitting 68.

An elastimeric bellows 70, which forms a lubricant receiving housing, is hermetically affixed to the shaft ends and to a marginal end portion of the barrel, with bellows 70 having a large diameter end 72 and a small diameter end 74. Bellows 76 is attached in a similar manner so that the remaining part of the assembly is likewise protected. Clamps 78 and 80 maintain the opposed marginal ends of the bellows tightly connected to the barrel and the shaft. Numerals 82 and 84 generally illustrate the constant diameter portion of the second bellows which form the attachment points of the clamps.

In the embodiment of FIG. 2, the suspension system of the vehicle includes a single axle member 30, which is sprung to the vehicle body and provides an excellent means by which the fixed bracket 128 can be mounted. FIG. 3 illustrates the type suspension found on most automotive type vehicles, wherein frame member 12 provides a suitable member for receiving the mount 128. The movable mount 124 is shown attached to relay arm 121, although it could equally well be attached to other portions of the steering linkage should it be found desirable or convenient to do so.

In operation, the stabilizer assembly of the present invention is selected in accordance with the basic design of the steering system of the vehicle with which it is to be combined. Where the vehicle is provided with a four wheel drive system, the apparatus disclosed in FIG. 4 is selected so that the fixed mount can be bolted directly to the front straight axle, while the movable mount is selected so that it can be attached to either the spindle arm or to the radius rod, as may be most expedient.

On the other hand, where the front suspension system is of the A-frame or knee-action type, the embodiments disclosed in FIG. 3 is preferably employed. Knee-action assemblies such as may be associated with motorhomes or the like are preferably arranged in accordance with the teachings of FIG. 3; while light weight "pick-up" trucks and the like are preferably provided with a stabilizer assembly such as disclosed in FIG. 4.

The improved stabilizer apparatus of the present invention can be affixed directly to the steering system of a vehicle without the necessity of disassembly of any components thereof merely by bolting the fixed mount into its appropriate location and thereafter attaching the movable mount to either the spindle arm or the radius rod by utilizing the U-bolts provided therefor. If care is taken to neutralize the steering wheel prior to installation of the stabilizer apparatus, no further adjustment thereof will be required.

Should subsequent adjustment of the steering characteristics of the vehicle be required, the spring retainers may be positioned respective to the fixed mount by means of the attendant adjusting lock nuts.

The spaced resilient housings hermetically seal the vulnerable parts of the stabilizer assembly from the deleterious effects of the elements, and additionally provide a lubricant chamber which eliminates corrosion, reduces noise level of the springs, and obviates dangers associated with accumulation of mud, ice, and other foreign matter. The grease contained within the resilient chambers cushion the bellows walls so that rocks and other flying objects which strike the assembly are cushioned, thereby preventing damage to the elastimeric material; and more importantly, preventing the foreign object from lodging between critical components thereof. The load transferring barrel performs a plurality of useful purposes, which include transfer of the biasing load between the steering mechanism and the vehicle body, protecton from the deleterious effects of the weather, lubrication and silencing of the spring assemblies, the provision of an annular chamber within which a marginal adjacent end of the opposed compression springs are housed, means by which lubricant can be transferred from one chamber into the other, protection of the springs and other components from flying objects and foreign matter, cushioning rapid and undesirable or unusual movements of the shaft, dampening out any shimmy or resonating motion between the shaft and the fixed bracket, as well as adding a pleasing and attractive appearance to the invention.

In one stabilizer apparatus made in accordance with the present invention, the following springs were found to be satisfactory: 1¼ inches hole diameter, ⅝ inch rod diameter; 6 inches free length; 375 pound load at solid height; 15 pound load at ⅛ inch deflection; with the material of construction being chrome vanadium steel. The springs were preloaded or placed in compression by tightening the adjustment nuts at the free end portion of the shaft an amount to compress the springs about one-half inch of their unloaded length.

In the claims, the term "steering system" is intended to relate to either the spindle arm or to a rod tied thereto; while the term "means by which said fixed mounting bracket is connected in fixed relationship with respect to said movable bracket" is intended to relate to structure associated with the vehicle frame.

The present invention, when used in combination with a road vehicle, resists movement of the steering wheels away from any predetermined neutral position. For this reason, should any external force tend to displace the steering wheels, the stabilizer apparatus will automatically resist the intervening force and assist steering of the vehicle in the proper direction.

I claim:

1. In a road vehicle, provided with a running gear in the form of a wheel suspension system, with one of the wheels being a steering wheel mounted for horizontal turning about a turning axis by an arm connected thereto, and having a steering system which includes means connected for moving the arm, the improvement comprising:
    a steering gear stabilizer apparatus for resisting turning movement of the steering wheel about the turning axis; said stabilizer apparatus comprising a fixed mounting bracket, a shaft having opposed ends, compression springs, spring retainers, and a movable mounting bracket;
    means by which said shaft is reciprocatingly received in supported relationship respective to said fixed mounting bracket;
    said springs being spaced from one another by said fixed mounting bracket;
    said spring retainers being affixed to opposed ends of said shaft in a position to bias each of said springs towards said fixed mounting bracket;
    means connecting one end of said shaft to said movable bracket;
    means by which said movable mounting bracket is affixed to said steering system; means by which said fixed mounting bracket is connected in fixed relationship with respect to said movable bracket;
    means forming an elastimeric grease receiving housing disposed about spaced marginal shaft lengths and encapsulating a spring therein, a passageway formed between each housing for transfer of grease therebetween upon movement of said shaft;
    so that turning movement of the wheel about the turning axis is resisted by one of said compression springs.

2. The improvement of claim 1 wherein said fixed mounting bracket is affixed to the main frame of the vehicle.

3. The improvement of claim 2 wherein said fixed mounting bracket is affixed to a cross-member of the vehicle.

4. The improvement of claim 1 wherein said movable bracket is affixed to the pitman arm of the steering system.

5. The improvement of claim 1 wherein said fixed mounting bracket is affixed to the main frame of the vehicle and said movable bracket is affixed to the pitman arm of the steering system.

6. The improvement of claim 1 wherein said fixed bracket has a barrel affixed thereto in a position to reciprocatingly receive said shaft in axially aligned relationship therethrough; an annular spring receiving shoulder formed within said barrel;
    said elastimeric grease receiving housing having one end thereof affixed to said barrel and the remaining end thereof affixed to said shaft in a position such that said spring thereof is contained therewithin.

7. In combination with a steerable vehicle having a steerable wheel supporting the vehicle and turnable about a turning axis, a stabilizer apparatus;
    said stabilizer apparatus comprising a single fixed mounting bracket, a shaft having opposed ends, compression springs, a universal joint, spring retainer, and a movable mounting bracket;
    means by which said shaft is reciprocatingly received in supported relationship respective to said fixed mounting bracket;
    said springs being spaced from one another by said fixed mounting bracket;
    said spring retainers being affixed to opposed ends of said shaft in a position to bias each of said springs towards said fixed mounting bracket;
    said universal joint connecting one end of said shaft to said movable bracket;
    means forming a collapsible lubricant receiving housing; said housing, spring, and shaft being concentrically arranged respectively to one another such that spaced marginal shaft lengths are located within a lubricant receiving housing; and, said lubricant receiving housing encapsulates the spring therewithin; means by which lubricant is transferred into and out of the housing as the housing expands and collapses in response to relative movement between the fixed and movable brackets;
    means by which said movable mounting bracket can be connected to said steering system;
    means by which said fixed mounting bracket can be connected to said vehicle in fixed relationship with respect to said movable bracket;
    so that turning movement of the steerable wheel about the turning axis is resisted by one of said compression springs.

8. The combination of claim 7 wherein said fixed mounting bracket is affixed to the main frame of the vehicle.

9. The combination of claim 7 wherein said fixed mounting bracket is affixed to a cross-member of the vehicle.

10. The combination of claim 7 wherein said movable bracket is affixed to the pitman arm of the steering system.

11. The combination of claim 10 wherein said fixed mounting bracket is affixed to the main frame of the vehicle.

12. The combination of claim 7 wherein said fixed bracket has a barrel affixed thereto in a position to reciprocatingly receive said shaft in axially aligned relationship therethrough; an annular spring receiving shoulder formed within said barrel;
    said lubricant receiving housing having one end thereof affixed to said barrel and the remaining end thereof affixed to said shaft in a position such that said spring thereof is contained therewithin.

* * * * *

UNITED STATES PATENT OFFICE
CERTIFICATE OF CORRECTION

PATENT NO. : 3,980,315
DATED : September 14, 1976
INVENTOR(S) : FRED W. HEFREN

It is certified that error appears in the above—identified patent and that said Letters Patent are hereby corrected as shown below:

Column 1, line 15, substitute --3,333,863-- for "3,333,963".

Column 5, Claim 3, line 1, substitute --claim 1-- for "claim 2".

Signed and Sealed this

Fifteenth Day of February 1977

[SEAL]

Attest:

RUTH C. MASON
Attesting Officer

C. MARSHALL DANN
Commissioner of Patents and Trademarks